Feb. 14, 1928.

R. JARDINE 1,658,925

VALVE AND METHOD OF MAKING SAME

Filed Dec. 26, 1925

INVENTOR
Robert Jardine
BY J.H.Gibbs
ATTORNEY

Patented Feb. 14, 1928.

1,658,925

UNITED STATES PATENT OFFICE.

ROBERT JARDINE, OF DETROIT, MICHIGAN, ASSIGNOR TO RICH TOOL COMPANY, OF DETROIT, MICHIGAN, A CORPORATION OF MAINE.

VALVE AND METHOD OF MAKING SAME.

Application filed December 26, 1925. Serial No. 77,814.

One object of the invention is to provide a valve having a stem composed substantially of one grade of metal, such as common steel, and a head comprising a seat of non-oxidizing metal in welded engagement with an end portion of a different grade of metal; said head being preferably welded to the stem whereby to provide a unitary structure which is so formed as to resist the corrosive effects of the hot gases of an internal combustion engine.

Another object of the invention is to provide a method of forming a valve that shall consist in forming a blank by welding a section of non-oxidizing metal between two sections of a different grade of metal and in upsetting one end section and the non-oxidizing section to form a valve head having a seat composed of non-oxidizing metal.

In a valve constructed in accordance with the invention, the stem is composed of a material having high strength and adapted to resist fatigue, and if so desired, a portion of the stem adjacent the head may be composed of high carbon steel or other anti-oxidizing metal, e. g., non-oxidizing steel. The head of the valve is welded to the stem and is composed of two different metals welded together to form a seat of anti-oxidizing metal (e. g. non-oxidizing steel) and a center portion or top of a different type of metal. The seat is composed of a metal adapted to resist the oxidizing effect produced by the hot gases in an internal combustion engine. The center portion of the head is formed of soft material such as low carbon common steel which can be easily worked to form a slot therein for a screw driver.

Figure 1:
Figure 1 is a view of a welded rod for forming a valve in accordance with the invention.

In Fig. 1 a blank in the form of a rod is shown comprising three sections, 1, 2 and 3. The intermediate section, 2, which is composed of a non-oxidizing metal such as steel of that character, is welded end to end to two end sections of a different type of metal, such, for example, as common steel. The end sections 1 and 3 are preferably formed of low carbon common steel in order to be easily worked and to resist the fatigue to which a valve is subjected. The central section 2 is composed of a non-oxidizing metal in order to resist the oxidizing effect which is produced by the hot gases in an internal combustion engine. In many cases the valves in an internal combustion engine are destroyed by a slow leak past the valve. Such leak will rapidly destroy the valve seat unless such seat is composed of a metal which will resist the oxidizing effect produced by the hot gases.

Figure 2:
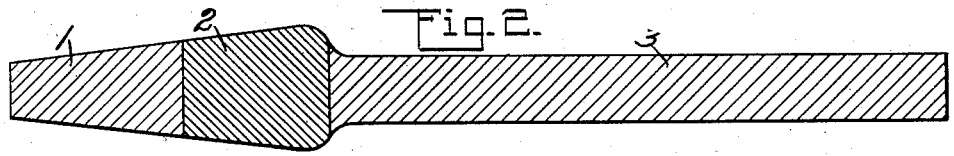
Figures 2 and 3 are views showing the initial upsetting operations for forming a valve head.
Figure 3:
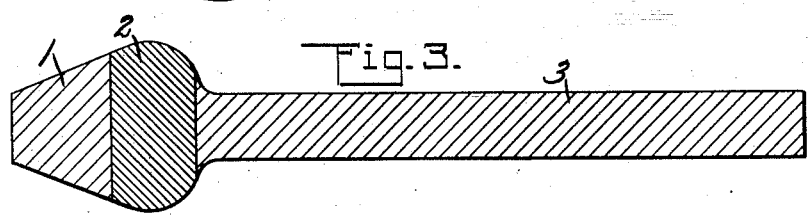
Figure 4:
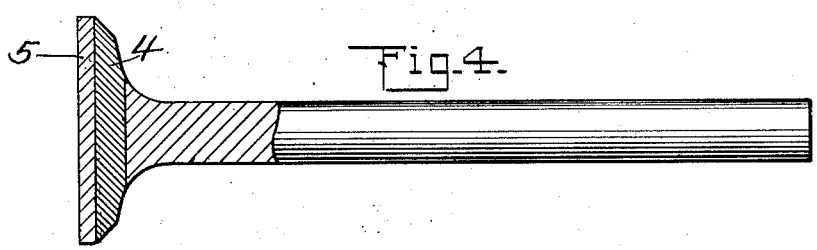
Figure 4 is a view showing a further step in upsetting the rod to form the valve head.
Figure 5:
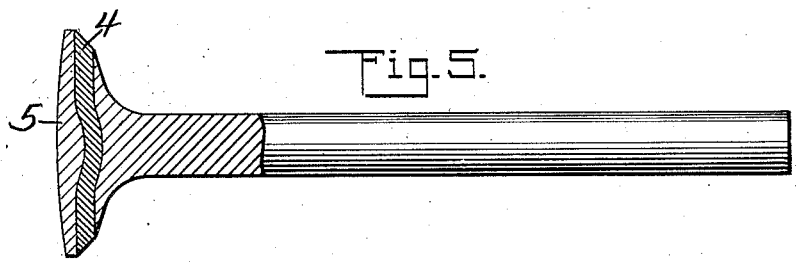
Figure 5 is a view showing the forming of a convex surface on the bottom of the valve head.
Figure 6:
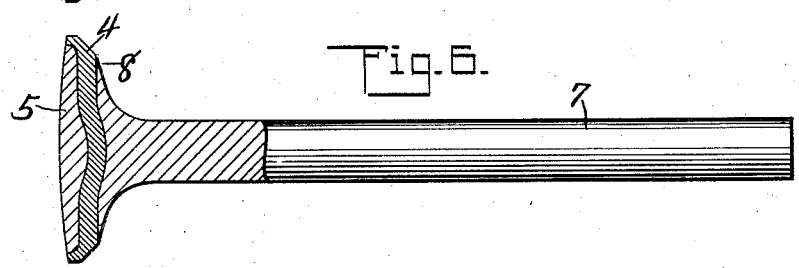
Figure 6 is a view of a completed valve.

Fig. 2 shows the change in the shape of the end section 1 and the non-oxidizing section 2 of the rod by the first blow in the upsetting operation. Fig. 3 shows a further step in the upsetting operation to shape the valve head. In Fig. 4 a further step in the upsetting operation is illustrated wherein the head is shown spread out and composed of a disc portion or layer of non-oxidizing material 4 and a top facing or layer of a different type of material 5, the sections 4 and 5, respectively, corresponding to the sections 2 and 1 in the blank shown in Fig. 1. In Figs. 5 and 6 further steps in the upsetting operation are illustrated wherein the bottom or seat portion 5 of the valve head is formed convex and the layer 4 is forged, spread, and extended down over the side of the layer of material 5. Thus, as shown in Fig. 6 of the drawings, the valve head comprises a seat 4 of non-oxidizing material which extends over a central section 5 of common steel. The central section 5 is formed of common steel in order to permit the forming of a slot for a screw driver therein with ease and in order to reduce the cost of the valve.

Referring to Fig. 6 of the drawings it will be noted a valve is illustrated comprising a stem 7 composed of common steel and a head 8 which is composed of two different metals. The seat 4 of the head is composed of non-oxidizing metal and the central top section 5 of the head is composed of a metal which may be easily worked.

Figure 7:
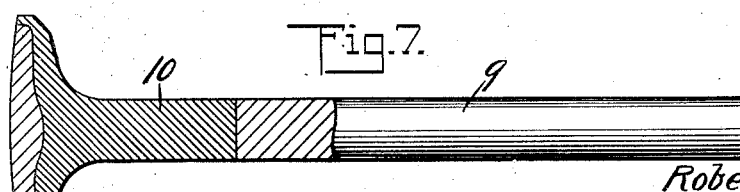
Figure 7 is a view of a valve wherein a portion of the stem is composed of non-oxidizing material.

If so desired a valve may be produced having a portion of the stem composed of non-oxidizing material. In such case it is necessary to extend the length of the non-oxidizing material included in the blank shown in Fig. 1. Thus in the blank shown in Fig. 1 the length of section 2 would be increased and the length of section 3 would be reduced. The head of the valve is formed in exactly the same manner as above set forth. In Fig. 7 of the drawing a valve is illustrated comprising a stem having a portion 9 thereof composed of a material similar to common steel and a portion 10 thereof composed of the same non-oxidizing material as composes the seat of the valve head. The valve head is similar in construction to the head shown in Fig. 6. The portion comprising the section 2 and the section 3 of the blank shown in Fig. 1 is only made large enough to allow material for any machining operation that may be necessary to shape the valve stem.

What is claimed is:

1. A method of fabricating a valve having a head disc portion of one type of metal interposed between stem and top portions of another type of metal, which method comprises forming a rod having an intermediate section of the first mentioned type of metal welded end to end between sections of the other type of metal, and upsetting and spreading out the intermediate section and one of those adjacent it to form the head disc portion and the top portion.

2. A method of fabricating a valve having a head with seating portion of non-corrosive steel and stem and top portions of common steel, which method comprises forming a blank having an intermediate section of non-corrosive steel welded end to end between sections of common steel, upsetting and spreading out the intermediate section and one of those adjacent it to form the valve head and top, and spreading and extending the metal of the intermediate section around the edge of the top to form the seating portion of the head.

3. A valve comprising a stem formed of low carbon steel, a head united with the end of the stem and formed of non-oxidizing metal having a marginal flange defining a recess and provided with a central portion of low carbon steel united only with said head and within the recess.

4. A valve comprising a stem formed of low carbon steel, a head united with the end of the stem to form with said stem a unitary structure, said head having a portion thereof formed of a metal having a different coefficient of expansion than the stem, and a central portion united with the before-mentioned head portion only and formed of low carbon steel.

5. A valve having the stem and a portion of the head formed of oxidizing metal and an intermediate marginally flanged portion formed of non-oxidizing metal, said intermediate portion defining the other portion of the head and the bearing surface for the valve and a portion of the stem.

6. The method of forming valve which comprises uniting alternate sections of low and high carbon steel with the latter between the former, and then upsetting one section of low carbon steel and the high carbon steel section to define a valve head.

7. The method of forming valves which comprises uniting a section of oxidizing metal with sections of non-oxidizing metal and then upsetting one section of non-oxidizing metal and the section of oxidizing metal to form a valve head.

8. The method of forming valves which comprises welding sections of low and high carbon steel together to form a unitary structure having alternate high and low carbon steel sections with the high carbon steel section between the low carbon steel sections and then upsetting the end of said structure to define a valve head having a portion thereof formed of the high carbon steel section.

In witness whereof I have hereunto set my hand.

ROBERT JARDINE.